United States Patent
Yamana et al.

(12) 
(10) Patent No.: US 6,531,525 B1
(45) Date of Patent: Mar. 11, 2003

(54) ABHERENT COMPSITION

(75) Inventors: Masayuki Yamana, Osaka (JP); Tsukasa Aga, Osaka (JP)

(73) Assignee: Daikin Industries, Ltd., Osaka (JP)

( * ) Notice: Subject to any disclaimer, the term of this patent is extended or adjusted under 35 U.S.C. 154(b) by 0 days.

(21) Appl. No.: 08/569,256

(22) PCT Filed: Jun. 22, 1994

(86) PCT No.: PCT/JP94/00995

§ 371 (c)(1),
(2), (4) Date: Dec. 22, 1995

(87) PCT Pub. No.: WO95/00307

PCT Pub. Date: Jan. 5, 1995

(30) Foreign Application Priority Data

Jun. 24, 1993 (JP) ............................................. 5-153237

(51) Int. Cl.⁷ ............................ C08L 27/18; C08L 83/04
(52) U.S. Cl. ........................ 524/135; 524/139; 524/142; 524/144; 524/146; 524/269; 525/101; 525/104
(58) Field of Search ................................ 524/146, 135, 524/139, 142, 144, 269; 525/101, 104

(56) References Cited

U.S. PATENT DOCUMENTS

| | | | | |
|---|---|---|---|---|
| 4,118,235 | A | * 10/1978 | Horiuchi | 106/38.22 |
| 5,079,299 | A | * 1/1992 | Hismoto | 525/100 |
| 5,165,976 | A | * 11/1992 | Newing et al. | 428/40 |
| 5,318,815 | A | * 6/1994 | Newing et al. | 428/40 |
| 5,464,586 | A | * 11/1995 | Wagner | 264/130 |

FOREIGN PATENT DOCUMENTS

| | | |
|---|---|---|
| EP | 0094574 | 11/1983 |
| EP | 0310966 A | 4/1989 |
| EP | 0469421 A2 | 2/1992 |
| JP | 52036588 A | 3/1977 |
| JP | 57048035 | * 10/1982 |
| JP | 1221443 A | 9/1989 |
| JP | 1285312 | * 11/1989 |
| JP | 1291908 | * 11/1989 |
| JP | 4226715 A | 8/1992 |
| JP | 4303649 A | 10/1992 |

OTHER PUBLICATIONS

Database WPI Section CH, Week 9404 Derwent Publications Ltd., AN 94–031992 corresponding to JP–A 05 339 537.

* cited by examiner

*Primary Examiner*—Patricia A Short
(74) *Attorney, Agent, or Firm*—Birch, Stewart, Kolasch & Birch, LLP

(57) ABSTRACT

An abherent composition which contains (A) a compound having $C_4$–$C_{20}$ perfluoro-alkyl or alkenyl group, (B) polytetrafluoroethylene having a number-average molecular weight of at most 500,000, and (C) at least one compound selected from the group consisting of a silicone oil, a silicone resin and a highly fluorinated compound having a boiling point of at least 100° C. except those included in the components (A) and (B), is disclosed. This composition prevents various articles from adhering to each other and is suitable as a mold release agent, an anti-blocking agent, a stripping agent for an electrical wire and the like.

7 Claims, No Drawings

ABHERENT COMPSITION

FIELD OF THE INVENTION

The present invention relates to a composition containing a fluorine-containing compound and giving a non-tackiness between articles. The present invention also relates to an anti-blocking agent, wire stripping agent and mold release agent comprising said composition as an active component.

RELATED ART

A material preventing the adhesion between the same materials or between different materials is required. For instance, in the case of the preparation of a shaped product made of, for example, cement, ceramics, or a polymeric material such as a synthetic resin or rubber, a mold release agent is frequently used in order to easily demold the shaped product from a (metal) mold.

In a coaxial cable having a shield layer formed from the braided metal small-gage wires on insulated electrical wire, an easy terminal treatment operation is desired by increasing a separation property between the shield layer and the insulated electrical wire. Also in the case of a cable prepared by applying a protective coating to several associated insulated electrical wires, a good separation property between the insulated electrical wires and the protective coating is important for the easy terminal treatment operation.

When rubber materials before or after the vulcanization are piled, the rubber materials adhere to each other due to the tackiness of the rubber materials themselves so that it is difficult to peel one rubber material from the other rubber material. Namely, a blocking phenomenon arises. In order to prevent the blocking phenomenon, it is necessary to use an anti-blocking agent in many cases.

For example, a natural or synthetic compound such as a silicone oil, a mineral oil, a paraffin wax, a fatty acid derivative and a glycol and an inorganic material such as talc and mica and the like are conventionally used as a mold release agent used for an easy separation from the mold during the molding process of the polymeric material and the like. Generally these mold release agents are coated on the mold before introducing the molded product in the mold. When a mold release life is short, the mold release agent is usually coated on the mold every molding process.

It is difficult to coat homogeneously the inorganic material such as talc and mica on the mold so that the inorganic material suffers from an insufficient mold releasability and a bad operation environment due to the scatter of powder.

The silicone oil is the most universally used mold release agent because of the good mold releasability. When the silicone oil is used for molding a material having a strong adhesion property such as a urethane or epoxy resin, it is necessary to coat the mold with the large amount of the silicone oil having an improved strength of a mold release agent film by the addition of fine powder such as silicon oxide. The large amount of the coating gives the migration of the mold release agent to the molded product so that it is difficult to conduct a post-treatment of a surface of the molded product, for example, a coating or adhesion treatment. In addition, the large amount of the coating is economically disadvantageous.

When the molding process is continued by coating the large amount of the mold release agent on the same mold, the tailings of the mold release agent or molded product remain on a mold surface and the mold must be often washed so as to decrease the efficiency of molding process.

A mold release agent comprising a phosphate ester of an alcohol having a perfluoroalkyl group and a silicone oil is known (cf. Japanese Patent Kokoku Publication No. 23270/1978) and is useful as a mold release agent for a resin having a high tackiness such as an epoxy resin.

However, when the mold release agent described in the above Publication is used as a stripping agent for facilitating a terminal processing operation of an electrical wire or an anti-blocking agent for a vulcanized or unvulcanized rubber, said mold release agent gives insufficient effect. The silicone oil and the inorganic material such as talc and mica also give insufficient effect. Talc and mica have the same problem as in the use of the mold release agent in addition to the insufficient effect.

SUMMARY OF THE INVENTION

An object of the present invention is to provide an abherent composition which can be used as a mold release agent, a stripping agent for an electrical wire and an anti-blocking agent for a synthetic resin and a vulcanized or unvulcanized rubber.

A gist of the present invention resides in a composition giving a abherent property to a substrate and comprising (A) a compound having a $C_4$–$C_{20}$ perfluoro-alkyl or alkenyl group, (B) polytetrafluoroethylene having a number-average molecular weight of at most 500,000, and (C) at least one compound selected from the group consisting of a silicone oil, a silicone resin and a highly fluorinated compound having a boiling point of at least 100° C. (except those included in the components (A) and (B)).

The other gist of the present invention resides in an anti-blocking agent, a stripping agent for an electrical wire and a mold release agent which contain said composition as an active component.

Hereinafter, the present invention will be explained in detail.

DETAILED DESCRIPTION OF THE INVENTION

Examples of the compound having the $C_4$–$C_{20}$ perfluoro-alkyl or alkenyl group which is one component of the composition according to the present invention are a phosphate ester or a salt thereof, a phosphonic acid derivative and a phosphinic acid derivative having a $C_4$–$C_{20}$ perfluoro-alkyl or alkenyl group, and a homopolymer or copolymer of a monosubstituted ethylene or a (meth)acrylate ester having a $C_4$–$C_{20}$ perfluoro-alkyl or alkenyl group. The phosphate ester or salt thereof having the perfluoro-alkyl or alkenyl group is particularly preferable.

The preferable example of the perfluoro-alkyl or alkenyl group-containing phosphate ester or salt thereof used in the present invention is a compound having the following formula in which one or two hydrogen atom of three hydroxyl groups in phosphoric acid (orthophosphoric acid, a chemical formula: $H_3PO_4$ or $PO(OH)_3$) is substituted with an organic group having $C_4$–$C_{20}$ perfluoro-alkyl group:

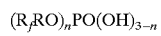

$$(R_fRO)_nPO(OH)_{3-n}$$

wherein $R_f$ is a $C_4$–$C_{20}$ perfluoroalkyl group, n is an integer of 1 to 2, R is a divalent organic group of the formula: —$CH_2CH(Z)C_mH_{2m}$— or —$SO_2N(R')C_lH_{2l}$—

(wherein Z is H, $CH_3$, $C_2H_5$, Cl or OR" (R" is H, $CH_3$, $C_2H_5$, $COCH_3$, $COC_2H_5$ or —$CH_2COOH$ or a salt thereof), m is an integer of 0 or 1–4, R' is a $C_1$–$C_4$ alkyl group, and l is an integer of 1–4, or salt thereof. Specific examples of the salt are an alkaline metal salt, an ammonium salt and an amine salt.

Particularly preferable perfluroalkyl group-containing phosphate ester is the perfluoroalkyl group-containing phosphate ester having the above formula in which $R_f$ is a $C_7$–$C_{20}$ perfluoroalkyl group, R is an alkylene group, a —$CH_2CH(Z)C_mH_{2m}$— group (wherein Z is OH or —$OCOCH_3$) or —$SO_2N(R')C_lH_{2l}$— (wherein R' is $CH_3$ or $C_2H_5$).

Specific examples of the perfluoroalkyl group-containing phosphate ester are as follows:

(A) $[(CF_3)_2CF(CF_2CF_2)_iCH_2CH(OH)CH_2O]_nPO(OH)_{3-n}$ (wherein i is an integer of at least 1)

(B) $[C_8F_{17}SO_2N(C_2H_5)CH_2CH_2O]_nPO(OH)_{3-n}$ (C) $(C_7F_{15}CH_2CH_2O)_nPO(OH)_{3-n}$ (D) $(CF_3)_2CF(CF_2CF_2)_iCH_2CH_2CH_2OPO(OH)_2$ (wherein i is an integer of at least 1)

(E) $(CF_3)_2CF(CF_2CF_2)_3CH_2CH(Cl)CH_2OPO(OH)_2$ (F) $(CF_3)_2CF(CF_2CF_2)_3CH_2CH(CH_3)OPO(OH)_2$ (G) $(CF_3)_2CF(CF_2CF_2)_3CH_2CH(OCH_2COOH)CH_2OPO(OH)_2$

The perfluoro-alkyl or alkenyl group-containing phosphate ester and salt thereof used in the present invention can be used alone or in combination of at least two.

The perfluoro-alkyl or alkenyl group-containing phosphonic acid derivative or phosphinic acid derivative used in the present invention is preferably of the formula:

wherein $R_f$ is a $C_4$–$C_{20}$ perfluoroalkyl or perfluoroalkenyl group, $R^1$ is a hydrogen atom, an alkaline metal atom, an ammonium group or a $C_1$–$C_5$ alkyl group, $R^2$ is a $C_1$–$C_{10}$ alkylene or —$CH_2CH(OR^3)CH_2$— group ($R^3$ is a hydrogen atom or a $C_1$–$C_{10}$ alkyl group), and each of j, k and l is an integer provided that $j \geq 1$, $k \geq 0$, $l \geq 0$, and j+k+l=3, or the formula:

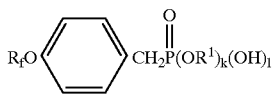

wherein $R_f$ and $R^1$ are as defined above, and each of k and l is an integer provided that $k \geq 0$, $l \geq 0$ and k+l=2.

The above phosphonic acid derivative or phosphinic acid derivative may be used in the form of a salt. Specific examples of the salt are the same as in the case of the phosphate ester.

Specific examples of the phosphonic acid derivative or phosphinic acid derivative are as follows:

$(CF_3CF_2(CF_2CF_2)_{2-8}CH_2CH_2)_{1-2}P(OH)_2$ $C_8F_{17}CH_2CH_2P(OH)_2$

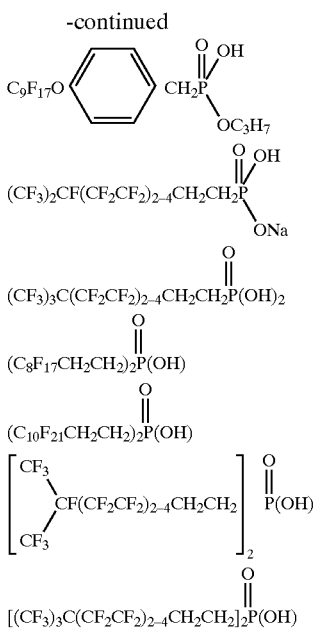

The perfluoro-alkyl or alkenyl group-containing phosphonic acid derivative or phosphinic acid derivative or salt thereof used in the present invention is used alone or in combination of at least two.

The homopolymer or copolymer of the perfluoro-alkyl or alkenyl group-containing mono-substituted ethylene or (meth)acrylate ester used in the present invention includes a homopolymer of one of the above monomers, a copolymer of at least two above monomers, and a copolymer of one of the above monomers with another copolymerizable monomer. Specific examples of the perfluoro-alkyl or alkenyl group-containing mono-substituted ethylene or (meth)acrylate ester are the following compounds of the formulas (1)–(5):

 (1)

 (2)

 (3)

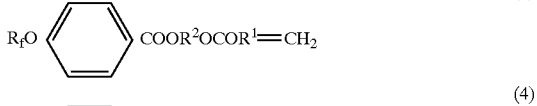 (4)

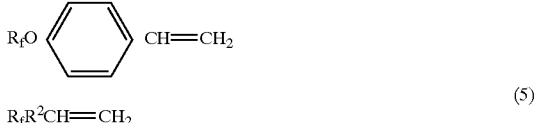 (5)

wherein $R_f$ is a $C_4$–$C_{20}$ perfluoroalkyl group or perfluoroalkenyl group, $R^1$ is a hydrogen atom or a methyl group, $R^2$ is a $C_1$–$C_{10}$ alkylene group or a —$CH_2CH(OR^3)CH_2$— group, $R^3$ is a hydrogen atom or a $C_1$–$C_{10}$ alkyl group, and $R^4$ is a $C_1$–$C_{10}$ alkylene group.

Specific examples of the fluorine-containing compounds of the formulas (1)–(5) are as follows:

$CF_3(CF_2)_4CH_2OCOC(CH_3)=CH_2$ $CF_3(CF_2)_5(CH_2)_2OCOC(CH_3)=CH_2$

-continued $CF_3(CF_2)_6OCOCH=CH_2$ $CF_3(CF_2)_7CH_2CH_2OCOCH=CH_2$

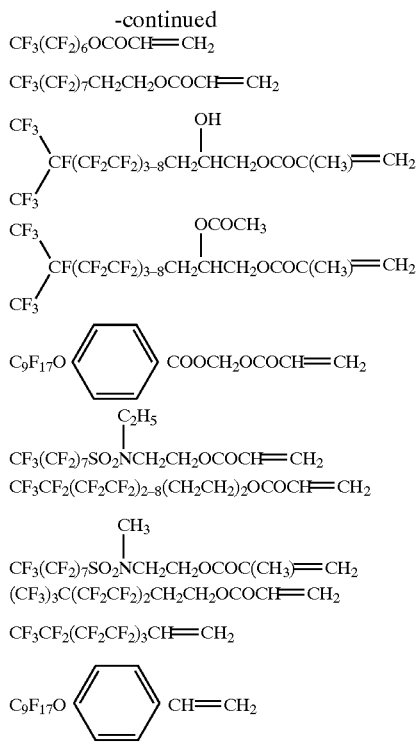

$CF_3(CF_2)_7SO_2NCH_2CH_2OCOCH=CH_2$
|
$C_2H_5$ $CF_3CF_2(CF_2CF_2)_{2-8}(CH_2CH_2)_2OCOCH=CH_2$ $CF_3(CF_2)_7SO_2NCH_2CH_2OCOC(CH_3)=CH_2$
|
$CH_3$ $(CF_3)_3C(CF_2CF_2)_2CH_2CH_2OCOCH=CH_2$ $CF_3CF_2(CF_2CF_2)_3CH=CH_2$

Specific examples of the monomer copolymerizable with the above monomers are methyl, ethyl, propyl, butyl, cyclohexyl, benzyl, octyl, 2-ethylhexyl, lauryl, tridecyl, cetyl, stearyl, methoxyethyl, ethoxyethyl, butoxyethyl, methoxypolyethylene glycol, 2-hydroxyethyl, 2-hydroxy-3-chloropropyl, diethylaminoethyl, glycidyl and tetrahydrofurfuryl esters of acrylic acid or methacrylic acid, acrylamide, methacrylamide, monovalent organic acid vinyl ester having 2 to 18 carbon atoms, a $C_1-C_{18}$ alkyl vinyl ether, vinyl chloride, vinylidene chloride, acrylonitrile, methacrylonitrile, (meth)acroxypropyltrimethoxysilane and the like.

Any of conventional polymerization procedures can be used and the conditions of the polymerization reaction can arbitrarily selected so as to give the homopolymer or copolymer of the perfluoroalkyl or perfluoroalkenyl group-containing mono-substituted ethylene or (meth)acrylate ester, or the copolymer thereof with the copolymerizable monomer. Specific examples of the polymerization procedure are a solution polymerization, an emulsion polymerization, a suspension polymerization, a bulk polymerization and the like. Firstly, a monomer selected from the perfluoroalkyl or perfluoroalkenyl group-containing mono-substituted ethylene and/or (meth)acrylate ester, and optionally the copolymerizable monomer are dissolved in a suitable organic solvent (the solution polymerization) or dispersed in water by the use of an emulsifier (the emulsion polymerization). Then, a polymerization initiation source such as a peroxide, an azo compound and an ionized radiation is applied to the solution or dispersion to give a polymer. The organic solvent is not limited, and may be, for example, a halogenated hydrocarbon solvent such as methylchloroform, tetrachlorodifluoroethane, 1,1,2-trichloro-1,2,2-trifluoroethane, trichloroethylene and tetrachloroethylene. An average molecular weight of the resultant polymer is from 2,000 to 60,000. An amount of the perfluoroalkyl or perfluoroalkenyl group-containing mono-substituted ethylene or (meth)acrylate ester is preferably at least 30 % by weight based on a total amount of the perfluoro-alkyl or alkenyl group-containing mono-substituted ethylene or (meth)acrylate ester and the copolymerizable monomer. The amount is preferably at least 60% by weight.

The abherent composition of the present invention contains polytetrafluoroethylene. The number-average molecular weight of polytetrafluoroethylene is at most 500,000, preferably from 50,000 to 300,000. If the number-average molecular weight is higher than 500,000, the composition had no good non-tackiness.

The amount of polytetrafluoroethylene is from 0.1 to 30 parts by weight, preferably from 0.5 to 20 parts by weight per 1 part by weight of the perfluoro-alkyl or alkenyl group-containing compound (A). If the amount is larger than 30 parts by weight, the composition has no good non-tackiness. If the amount is smaller than 0.1 parts by weight, the composition exhibits no non-tackiness.

The composition of the present invention contains at least one compound selected from the group consisting of the silicone oil, the silicone resin and the highly fluorinated compound having the boiling point of at least 100° C. (except the compounds included in the components (A) and (B)).

The silicone oil used in the present invention is preferably a non-curable polysiloxane having a side chain of a $C_1-C_5$ alkyl group, a $C_1-C_5$ fluoroalkyl group, a phenyl group and the like which is a liquid or semisolid at a room temperature.

The silicone resin used in the present invention may be widely used conventional one and may be, for example, a methylsilicone varnish. The methylsilicone varnish is a copolymer having various repeating units of $SiO_2$, $CH_3SiO_{3/2}$, $(CH_3)_2SiO$, $(CH_3)_3SiO_{1/2}$ or the like and having a three-dimensional network. The copolymer may or may not have a crosslinkable group (for example, a hydroxyl group).

Specific examples of the highly fluorinated compound having a boiling point of at least 100° C. are those except the compound (A) and compound (B) and are preferably a polychlorotrifluoroethylene or perfluoropolyether oil having a repeating unit of the formula:

$$-(CF_2CFCl)_n-$$

(wherein n is 2 to 15)

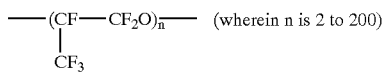 (wherein n is 2 to 200)

or $$-(CF_2CF_2CF_2-O)_n-$$

(wherein n is 2 to 200).

Specific examples of the highly fluorinated compound are Krytox (manufactured by Du Pont), Fomblin (manufactured by Montefluos), Daifloil (manufactured by Daikin Industries Ltd.) and Demnum (manufactured by Daikin Industries Ltd.).

The compound (C) is used in an amount of 0.05 to 10 parts by weight, preferably 0.2 to 5 parts by weight per 1 part by weight of the perfluoro-alkyl or alkenyl group-containing compound (A). If the amount is larger than 10 parts by weight, an adherend has a high stickiness so that the post-treatment cannot be conducted. If the amount is smaller than 0.2 parts by weight, the composition does not have the slipperiness required for an abhesive agent.

Each component of the composition is dissolved, dispersed or emulsified in a medium of water or an organic solvent to give a liquid.

Specific examples of the organic solvent used as the medium are alcohols such as methanol, ethanol, propanol and isopropanol; ketones such as acetone, methyl ethyl ketone and methyl isobutyl ketone; ethers such as ethyl ether, isopropyl ether, dioxane and tetrahydrofuran; esters such as ethyl acetate and butyl acetate; halogenated hydrocarbons such as carbon tetrachloride, methylene chloride, ethylene chloride, trichloroethylene, perchloroethylene, trichloroethane, trichlorotrifluoroethane, tetrachlorodifluoroethane. The organic solvent may be used alone or in combination.

When water is used as the medium, a surfactant is used for dispersing or emulsifying each component in water. Suitable surfactant may be any of usual anionic, cationic, nonionic and amphoteric surfactants and is not limited. Specific examples of various surfactants are as follows:

Anionic Surfactant:
   a higher fatty acid alkaline salt, an alkylsulfate salt, an alkylsulfonic acid salt,
   an alkylarylsulfonic acid salt, an alkylphosphoric acid ester, a fluorine-containing carboxylic acid, a fluorine-containing sulfonic acid and the like Cationic Surfactant:
   a higher amine halogen-containing acid salt, a halogenated alkyl pirydinium,
   a quaternary ammonium salt, a polyoxyethylenealkylamine and the like Nonionic Surfactant:
   a polyoxyethylenealkyl ether, a polyoxyethylenealkyl ester, a sorbitanalkyl ester, a sugar ester and the like Amphoteric Surfactant:
   a secondary, tertiary or quaternary ammonium salt and the like including betaine and imidazoline types
   A carboxylic acid, a sulfate ester, a sulfonic acid and a phosphoric acid ester are useful as an anionic group.

The abherent composition of the present invention can be coated on a surface of a resin, a fiber, a rubber, a paper, a metal, a ceramic and the like and can prevent the adhesion between these materials. For example, each component of the composition of the present invention is dissolved, dispersed or emulsified in the medium of water or organic solvent to prepare a liquid, and the liquid is coated on a substrate by a conventional procedure such as the dipping, the spraying, the brush coating and the coating with an impregnated fabric and then usually dried to remove the medium (water or organic solvent). The amount of coating is 2 to 100 g/m$^2$, preferably from 5 to 50 g/m$^2$ in solid.

The composition of the present invention can be used for the prevention of adhesion between different kind of materials in addition to the prevention of adhesion between the same kind of materials. Preferable examples of the combination of the substrates coated with the composition of the present invention are the combination of the same kind materials, the combination of a resin and a metal, the combination of a rubber and a ceramic, the combination of a rubber and a metal, the combination of a metal and a ceramic and the like. The composition of the present invention is particularly useful as a mold release agent for molding a shaped article, a stripping agent for an electrical wire and an anti-blocking agent for a synthetic resin or a vulcanized or unvulcanized rubber.

EXAMPLES

The composition of the present invention will be illustrated with reference to the following Examples. In addition, the non-tackiness of substrate and a stripping property of electrical wire coated with the composition will be illustrated.

Example 1

To a liquid prepared by dissolving 0.25 parts by weight of a polyoxyethylene alkyl amine surfactant (Nissan Naimin S-220 manufactured by Nippon Oil & Fats Co. Ltd.) in 100 parts by weight of water, was added 1 part by weight of a perfluoroalkyl group-containing phosphate ester [(CF$_3$)$_2$CF(CF$_2$CF$_2$)$_3$CH$_2$CH(OH)CH$_2$O]$_n$PO(OH)$_{3-n}$ (n=1~3, average of n=1.4), 2 parts by weight of a silicone oil (Silicone SH 200 manufactured by Toray Dow Corning Silicone Kabushiki Kaisha) and 5 parts by weight of a polytetrafluoroethylene (PTFE) dispersion (Lublon LDW-10 manufactured by Daikin Industries Ltd, number average molecular weight: 200,000). The mixture was stirred with a homomixer to give an emulsion.

Example 2

The same procedure as in Example 1 was repeated to give an emulsion, except that 2 parts by weight of a fluorine-containing oil (Daifloil No. 1 manufactured by Daikin Industries Ltd., which contains Cl(CF$_2$CFCl)$_3$Cl as a main component) was used instead of the silicone oil.

Example 3

The same procedure as in Example 1 was repeated to give an emulsion, except that 1 part by weight a NH$_4$ salt of the perfluoroalkyl group-containing phosphate ester used in Example 1 was used instead of the perfluoroalkyl group-containing phosphate ester, 0.25 parts by weight of a polyoxyethyleneoctylphenyl ether (Nissan Nonion HS-208 manufactured by Nippon Oil & Fats Co. Ltd.) was used instead of the polyoxyethylene alkyl amine surfactant and Silicone Emulsion SH 7036 (an aqueous emulsion having a concentration of about 38 %)(manufactured by Toray Dow Corning Silicone Kabushiki Kaisha) was used instead of Silicone SH 200.

Example 4

The same procedure as in Example 1 was repeated to give an emulsion, except that 1 part by weight of a NH$_4$ salt of (CF$_3$)$_2$CF(CF$_2$CF$_2$)$_3$CH$_2$CH$_2$CH$_2$OPO(OH)$_2$ was used instead of the perfluoroalkyl group-containing phosphate ester, and 0.25 parts by weight of a polyoxyethylene monooleate (Nissan Nonion O-2 manufactured by Nippon Oil & Fats Co. Ltd.) was used instead of the polyoxyethylene alkyl amine surfactant.

Example 5

The same procedure as in Example 1 was repeated to give an emulsion, except that 1 part by weight of a NH$_4$ salt of (CF$_3$)$_2$CF(CF$_2$CF$_2$)$_3$CH$_2$CH(CH$_3$)OPO(OH)$_2$ was used instead of the phosphate ester, 0.25 parts by weight of polyoxyethylenealkylether sulfate ester salt (Nissan Tracks K-40 manufactured by Nippon Oil & Fats Co. Ltd.) (about 35% aqueous solution) was used instead of the polyoxyethylene alkyl amine surfactant and 2 parts by weight of a fluorine-containing oil (Demnum S-20 manufactured by Daikin Industries Ltd., average molecular weight: 2,900) was used instead of Silicone SH 200.

Comparative Example 1

The same procedure as in Example 1 was repeated to give an emulsion, except that PTFE was not used.

Comparative Example 2

The same procedure as in Example 1 was repeated to give an emulsion, except that the silicone oil was not used.

Comparative Example 3

The same procedure as in Example 1 was repeated to give an emulsion, except that the perfluoroalkyl group-containing phosphate ester was not used.

Comparative Example 4

The same procedure as in Example 1 was repeated to give an emulsion, except that each of the silicone oil and PTFE was not used.

Comparative Example 5

The same procedure as in Example 1 was repeated to give an emulsion, except that each of the phosphate ester and PTFE was not used.

Comparative Example 6

The same procedure as in Example 1 was repeated to give an emulsion, except that each of the phosphate ester and the silicone oil was not used.

Comparative Example 7

The same procedure as in Example 1 was repeated to give an emulsion, except that PTFE having a number-average molecular weight of 3,500,000 was used instead of PTFE having the number-average molecular weight of 200,000.

Comparative Example 8

The same procedure as in Example 1 was repeated to give an emulsion, except that a tetrafluoroethylene/perfluoroalkyl vinyl ether copolymer (PFA) dispersion (AD-1S manufactured by Daikin Industries Ltd.) was used instead of PTFE.

Comparative Example 9

The same procedure as in Example 1 was repeated to give an emulsion, except that a tetrafluoroethylene/hexafluoropropylene copolymer (FEP) dispersion (ND-1 manufactured by Daikin Industries Ltd.) was used instead of PTFE.

The ingredients of compositions of Examples 1–5 and Comparative Examples 1–9 are shown in Table 1.

Non-tackiness Test

The following non-tackiness test was conducted by using the above compositions.

1. Preparation of a Sample Piece

A composition (60 mg in solid) was uniformly coated on one surface of a flexible polyvinyl chloride standard test sheet having a size of 2 mm (thickness)×30 mm×100 mm (manufactured by Takafuji Kasei) and dried at 100° C. for 3 minutes in a dryer.

After kept standing at a room temperature, another untreated sheet was piled on the treated surface of the test sheet to give a sample piece.

2. Test Procedure and Conditions

The test piece prepared in the above item 1 was pressed in a pressing machine at the press condition of 100° C., 20 kg/cm$^2$ and 30 seconds.

Said press condition is a condition that the pressing of two untreated flexible polyvinyl chloride sheets gives a large tackiness without the collapse of the sheet shape (namely one sheet can be peeled from another sheet only with a remarkable force).

3. Evaluation of a Non-tackiness Property

A non-tackiness property of the test piece pressed in the above item 2 was evaluated by manually peeling one sheet from the another sheet.

Standard for Evaluating the Non-tackiness Property from Another Sheet:

5: one sheet is voluntarily peeled from another sheet
4: one sheet can be peeled with little force
3: one sheet can be peeled with a slight force
2: one sheet can be scarcely peeled due to a partial tackiness
1: one sheet can be peeled with a remarkable force, since whole surfaces have remarkable tackiness The results are shown in Table 1.

Stripping Property of an Electrical Wire

The stripping property of an electrical wire was evaluated by using the above compositions.

1. Preparation of Sample

A sample was prepared as follows:
i) After a polyvinyl chloride was coated on a copper wire by an extruder at 170° C. to give an insulating layer 1 having a thickness of 1 mm, a stripping agent was coated on the insulating layer 1 by using a sponge impregnated with the stripping agent.
ii) A polyvinyl chloride resin was coated by an extruder at 170° C. on the copper wire having the insulating layer 1 coated with the stripping agent prepared in the above item i) to give an insulating layer 2 having a thickness of 0.5mm.

2. Test Procedure and Conditions

The insulating layer 2 of the sample prepared in the above item 1 was stripped with a perforated nipper.

3. Evaluation of Stripping Property

The state at the stripping was evaluated in the following three ranks:

Good: The stripping can be smoothly conducted and gives no elongation of the insulating layer 1.
Poor: The stripping can be barely conducted, but gives an elongation of the insulating layer 1.
Very Poor: The stripping can be never or hardly conducted.

The results are shown in Table 1.

TABLE 1

| | Perfluoroalkyl group-containing phosphate ester | | Surfactant | | Silicone or fluorine-containing oil | | Polytetrafluoroethylene | | Non-tackiness property | Electrical wire stripping property |
|---|---|---|---|---|---|---|---|---|---|---|
| | Type [*1] | Amount (part) | Type [*2] | Amount (part) | Type [*3] | Amount (part) | Type [*4] | Amount (part) | | |
| Ex. 1 | (A) | 1 | (1) | 0.25 | (i) | 2 | PTFE1 | 5 | 5 | Good |
| Ex. 2 | (A) | 1 | (1) | 0.25 | (iii) | 2 | PTFE1 | 5 | 4–5 | Good |
| Ex. 3 | NH$_4$ salt of (A) | 1 | (3) | 0.25 | (ii) | 2 | PTFE1 | 5 | 4–5 | Good |
| Ex. 4 | NH$_4$ salt of (D) | 1 | (2) | 0.25 | (i) | 2 | PTFE1 | 5 | 5 | Good |
| Ex. 5 | NH$_4$ salt of (F) | 1 | (4) | 0.25 | (iv) | 2 | PTFE1 | 5 | 4 | Good |
| Com. Ex. 1 | (A) | 1 | (1) | 0.25 | (i) | 2 | — | — | 3 | Poor |
| Com. Ex. 2 | (A) | 1 | (1) | 0.25 | — | — | PTFE1 | 5 | 2 | Very poor |
| Com. Ex. 3 | — | — | (1) | 0.25 | (i) | 2 | PTFE1 | 5 | 3 | Poor |
| Com. Ex. 4 | (A) | 1 | (1) | 0.25 | — | — | — | — | 2 | Very poor |

TABLE 1-continued

| | Perfluoroalkyl group-containing phosphate ester | | Surfactant | | Silicone or fluorine-containing oil | | Polytetrafluoro-ethylene | | Non-tackiness property | Electrical wire stripping property |
|---|---|---|---|---|---|---|---|---|---|---|
| | Type *1 | Amount (part) | Type *2 | Amount (part) | Type *3 | Amount (part) | Type *4 | Amount (part) | | |
| Com. Ex. 5 | — | — | (1) | 0.25 | (i) | 2 | — | — | 3 | Poor |
| Com. Ex. 6 | — | — | (1) | 0.25 | — | — | PTFE1 | 8 | 2 | Very poor |
| Com. Ex. 7 | (A) | 1 | (1) | 0.25 | (i) | 2 | PTFE2 | 5 | 3 | Poor |
| Com. Ex. 8 | (A) | 1 | (1) | 0.25 | (i) | 2 | PFA | 5 | 2 | Very poor |
| Com. Ex. 9 | (A) | 1 | (1) | 0.25 | (i) | 2 | FEP | 5 | 3 | Poor |

Note for Table 1:
*1 Phosphate ester
(A) $[(CF_3)_2CF(CF_2CF_2)_3CH_2CH(OH)CH_2O]_nPO(OH)_{3-n}$
(n = 1~3, average: 1.4),
(D) $(CF_3)_2CF(CF_2CF_2)_3CH_2CH_2CH_2OPO(OH)_2$
(F) $(CF_3)_2CF(CF_2CF_2)_3CH_2CH(CH_3)OPO(OH)_2$
*2
(1) Polyoxyethylenealkylamine (Nissan Naimin S-220 manufactured by Nippon Oil & Fats Co. Ltd.)
(2) Polyoxyethylene monooleate (Nissan Nonion 0-2 manufactured by Nippon Oil & Fats Co. Ltd.)
(3) Polyoxyethyleneoctylphenylether (Nissan Nonion HS-208 manufactured by Nippon Oil & Fats Co. Ltd.)
(4) Polyoxyethylenealkylether sulfate ester salt (35% aqueous solution, Nissan Tracks K-40 manufactured by Nippon Oil & Fats Co. Ltd.)
*3
(i) Silicone SH 200 manufactured by Toray Silicone Kabushiki Kaisha
(ii) Silicone Emulsion SH-7036 (38% aqueous emulsion manufactured by Toray Silicone Kabushiki Kaisha)
(iii) $Cl(CF_2CFCl)_3Cl$ (Daifloil No. 1 manufactured by Daikin Industries Ltd.)
(iv) a repeating unit: $-(CF_2CF_2CF_2O)_n-$
n = 16 (Demnum S-20 manufactured by Daikin Industries Ltd.)
*4
PTFE 1: Polytetrafluoroethylene, number-average molecular weight: 200,000
PTFE 2: Polytetrafluoroethylene, number-average molecular weight: 3,500,000
PFA: Tetrafluoroethylene/perfluoroalkylvinylether copolymer
FEP: Tetrafluoroethylene/hexafluoropropylene copolymer

What is claimed is:

1. An abherent composition consisting essentially of:
    (A) 1 part per weight of at least one compound selected from the group consisting of phosphate ester or salt thereof, a phosphonic acid derivative, and a phosphinic acid derivative, having at least one $C_4-C_{20}$ perfluoroalkyl or alkenyl group,
    (B) 0.5–20 parts per weight of polytetrafluoroethylene having a number-average molecular weight of 50,000 to 500,000, and
    (C) 0.2–5 parts per weight of at least one compound selected from the group consisting of a silicone oil, a silicone resin and a highly fluorinated compound having a boiling point of at least 100° C. wherein compound (C) is not a compound of (A) or (B).

2. The composition according to claim 1, wherein the phosphate ester is of the formula:

$$(R_fRO)_nPO(OH)_{3-n}$$

wherein $R_f$ is a $C_4-C_{20}$ perfluoro-alkyl group,
n is an integer of 1 to 2,
R is a divalent organic group of the formula: $-CH_2CH(Z)C_mH_{2m}-$ or $-SO_2N(R')C_lH_{2l}-$
(wherein Z is H, $CH_3$, $C_2H_5$, Cl or OR" (R" is H, $CH_3$, $C_2H_5$, $COCH_3$, $COC_2H_5$ or $-CH_2COOH$ or a salt thereof), m is an integer of 0 or 1–4, R' is a $C_1-C_4$ alkyl group, and l is an integer of 1–4.

3. The composition according to claim 1, wherein the phosphonic acid derivative (A) or the phosphinic acid derivative is of the formula:

$$(R_fR^2)_jP(OR^1)_k(OH)_l$$
$$\overset{O}{\|}$$

wherein $R_f$ is a $C_4-C_{20}$ perfluoroalkyl or perfluoroalkenyl group, $R^1$ is a hydrogen atom, an alkaline metal atom, an ammonium group or a $C_1-C_5$ alkyl group, $R^2$ is a $C_1-C_{10}$ alkylene or $-CH_2CH(OR^3)CH_2-$ group ($R^3$ is a hydrogen atom or a $C_1-C_{10}$ alkyl group), and each of j, k and l is an integer provided that $j \geq 1$, $k \geq 0$, $l \geq 0$, and j+k+l=3, or the formula:

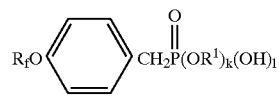

wherein $R_f$ and $R^1$ are as defined above, and each of k and l is an integer provided that $k \geq 0$, $l \geq 0$ and k+l=2 or a salt thereof.

4. The composition according to claim 1, wherein the highly fluorinated compound is of the formula:

$$(CF_2CFCl)_n$$

(wherein n is 2 to 15)

| | |
|---|---|
| $(CF_2CFCl)_n$ | (wherein n is 2 to 15) |
| $(CF_2-CF_2-O)_n$ <br> $\|$ <br> $CF_3$ | (wherein n is 2 to 200) |
| $(CF_2CF_2CF_2O)_n$ | (wherein n is 2 to 200) |

5. An anti-blocking agent which contains the composition according to claim 1 as an active component.

6. A stripping agent for an electrical wire, which contains the composition according to claim 1 as an active component.

7. A mold release agent which contains the composition according to claim 1 as an active component.

* * * * *